(12) United States Patent
Yoshida et al.

(10) Patent No.: US 8,698,995 B2
(45) Date of Patent: Apr. 15, 2014

(54) LIQUID CRYSTAL DISPLAY PANEL HAVING PARTICULAR LAMINATE SPACER

(75) Inventors: Takehisa Yoshida, Osaka (JP); Masayuki Katagami, Osaka (JP); Atsushi Ban, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 187 days.

(21) Appl. No.: 13/496,495

(22) PCT Filed: Jun. 18, 2010

(86) PCT No.: PCT/JP2010/060379
§ 371 (c)(1),
(2), (4) Date: Apr. 12, 2012

(87) PCT Pub. No.: WO2011/040097
PCT Pub. Date: Apr. 7, 2011

(65) Prior Publication Data
US 2012/0188494 A1    Jul. 26, 2012

(30) Foreign Application Priority Data
Sep. 30, 2009 (JP) .................................. 2009-228586

(51) Int. Cl.
*G02F 1/1339* (2006.01)
*G02F 1/1335* (2006.01)

(52) U.S. Cl.
USPC ........................... 349/155; 349/157; 349/106

(58) Field of Classification Search
CPC ............ G02F 1/13394; G02F 1/13392; G02F 1/33512; G02F 1/133514; G02F 1/133516
USPC .......................................... 349/155, 157, 106
See application file for complete search history.

(56) References Cited

U.S. PATENT DOCUMENTS

| | | | |
|---|---|---|---|
| 6,275,280 B1 * | 8/2001 | Kajita et al. | 349/155 |
| 6,512,504 B1 * | 1/2003 | Yamauchi et al. | 345/87 |
| 2006/0290830 A1 | 12/2006 | Teramoto et al. | |

FOREIGN PATENT DOCUMENTS

| | | |
|---|---|---|
| JP | 09-043592 A | 2/1997 |
| JP | 10-268356 A | 10/1998 |
| JP | 2002-055349 A | 2/2002 |
| JP | 2007-003778 A | 1/2007 |
| JP | 2008-039802 A | 2/2008 |

OTHER PUBLICATIONS

Official Communication issued in International Patent Application No. PCT/JP2010/060379, mailed on Sep. 14, 2010.
Waratani et al., "Color Filter Substrate, Liquid Crystal Display Panel and Liquid Crystal Display Device", U.S. Appl. No. 13/392,153, filed Feb. 24, 2012.

* cited by examiner

*Primary Examiner* — Mike Qi
(74) *Attorney, Agent, or Firm* — Keating & Bennett, LLP

(57) ABSTRACT

The present invention provides a liquid crystal display panel provided with a laminate spacer including a plurality of primary color filters which can avoid deterioration of the display quality and improve the production efficiency. The liquid crystal display panel of the present invention comprises: an array substrate provided with a first electrode; a color filter substrate provided with a second electrode; and a liquid crystal layer sandwiched between the array substrate and the color filter substrate, wherein the color filter substrate further includes: four or more differently colored transparent layers, the colors of which include red, green, blue, and at least one of yellow and white; and a laminate spacer formed by the second electrode and at least two layers among the four or more differently colored transparent layers, and the laminate spacer is surrounded by the yellow or white transparent layer when viewed in a plan view.

5 Claims, 10 Drawing Sheets

LIQUID CRYSTAL DISPLAY PANEL HAVING PARTICULAR LAMINATE SPACER

TECHNICAL FIELD

The present invention relates to a liquid crystal display panel. More specifically, the present invention relates to a liquid crystal display panel provided with multiple primary color filters.

BACKGROUND ART

A liquid crystal display (LCD) panel includes a liquid crystal layer sandwiched between a pair of substrates. In order to produce images, the polarization of light passing through the liquid crystal layer is changed by controlling the alignment of liquid crystal molecules by applying a voltage to the liquid crystal layer via electrodes formed on the substrates. Such a liquid crystal display panel is provided with a plurality of differently colored filters on one of the substrates to produce color images.

In such a liquid crystal display panel, the substrates are combined with each other through a sealing material but are spaced by a certain distance (cell gap) secured by a spacer. For example, transparent beads are used as a spacer. However, the use of such a spacer may lead to a low contrast level since the spacer beads may not be uniformly dispersed. To avoid this, a resin laminate spacer having a certain thickness may be used. Resin layers of such a spacer may be color filters.

More recently, attempts have been made on a liquid crystal display panel in which one of a pair of substrates is provided with color filter layers and a counter electrode that covers a spacer including color filters, and the other substrate is provided with pixel electrodes, in order to avoid electrical coupling between the counter electrode and the pixel electrodes and thereby an electrical short circuit therebetween which inhibits voltage application to liquid crystal. Specifically, for example, a portion of each pixel electrode facing the spacer or a portion of the counter electrode on the spacer is removed and an insulating film is formed between the counter electrode and the pixel electrodes (for example, Patent Document 1).

Patent Document 1: JP 2002-55349 A

SUMMARY OF THE INVENTION

Problems to be Solved by the Invention

The present inventors have studied the structure of various spacers including transparent colored layers (hereinafter, also referred to as laminate spacers) in liquid crystal display panels provided with a plurality of transparent colored layers of primary colors, and focused on the insulating film formed between the counter electrode and the pixel electrodes of Patent Document 1, and also focused that without the insulating film, electrical coupling between the counter electrode and the pixel electrodes can be prevented and the production processes can be simplified by securing a space between the counter electrode and the pixel electrodes.

Even if an insulating film is formed on a laminate spacer, there still remains a probability of display troubles. This is specifically because if the insulating film on the laminate spacer is not strong enough, the insulating film may be damaged when pressing force is applied to the laminate spacer due to, for example, an external pressure to the display device, and because, in this case, the positional relationship between the electrodes may be changed, resulting in a short circuit (leak) between the electrodes formed on the respective substrates.

The present invention has been made in view of the above problem, and an object of the present invention is to provide a liquid crystal display panel provided with a laminate spacer including a plurality of primary color filters which can avoid deterioration of the display quality and improve the production efficiency.

Means for Solving the Problems

After the intensive studies on the above problem, the present inventors have found that the display quality is not affected so much even if a short circuit in a yellow or white pixel causes a display trouble because desired colors can be produced by the other red, green, and blue transparent layers. Further, the present inventors found that in the case that laminate spacers including transparent colored layers of several colors are surrounded by yellow and/or white transparent layers serving as pixel openings, it is possible to avoid defects in red, green, and blue pixels even if a short circuit occurs between the electrodes of both substrates. Thus, the present inventors found a way to solve the above problem and completed the present invention.

Specifically, the present invention provides a liquid crystal display panel including:

an array substrate provided with a first electrode;
a color filter substrate provided with a second electrode; and
a liquid crystal layer sandwiched between the array substrate and the color filter substrate, wherein the color filter substrate further includes: four or more differently colored transparent layers, the colors of which include red, green, blue, and at least one of yellow and white; and a laminate spacer formed by the second electrode and at least two layers among the four or more differently colored transparent layers, and the laminate spacer is surrounded by the yellow or white transparent layer when viewed in a plan view.

The liquid crystal display panel according to the present invention includes an array substrate provided with a first electrode; a color filter substrate provided with a second electrode; and a liquid crystal layer sandwiched between the array substrate and the color filter substrate. If the first electrode formed on the array substrate is a plurality of pixel electrodes, the alignment of liquid crystal is controlled for each pixel, which in turn leads to control of the display color for each pixel. In this case, the second electrode formed on the color filter substrate, which faces the array substrate, is preferably a common electrode formed on the entire surface of the color filter substrate, from the viewpoint of the production efficiency. The mode for controlling liquid crystal molecules in the liquid crystal layer may be, but is not particularly limited to, a TN (Twisted Nematic), VA (Vertical Alignment), or IPS (In-Plane Switching) mode, or the like.

The color filter substrate further includes four or more differently colored transparent layers, the colors of which include at least red, green, blue, and one of yellow and white. The color filter substrate including four or more differently colored transparent layers provides a wider color reproduction range, compared to one including transparent colored layers of the three primary colors: red; green; and blue. In the present invention, the colors need to include the three colors of red, green, and blue, and one of yellow and white, and may optionally include other colors. For example, the colors may include both yellow and white. The terms "red", "green", "blue", and "yellow" herein mean colors that are characterized by a predominant component in a specific wavelength range and are perceived as colors by eyes. The term "white" herein means a color that cannot be characterized by a predominant component in a specific wavelength range and cannot be perceived as a color by eyes. More specifically, the term "red" herein means a wavelength component having a main wavelength of 650 to 780 nm; the term "green" herein means a wavelength component having a main wavelength of 510 to 570 nm; the term "blue" herein means a wavelength component having a main wavelength of 470 to 510 nm; and the term "yellow" herein means a wavelength component having a main wavelength of 570 to 650 nm. In particular, the "yellow" improves the transmittance and color reproducibility and the "white" remarkably improves the transmittance.

The color filter substrate includes a laminate spacer formed by the second electrode and at least two layers among the four or more differently colored transparent layers. Since the laminate spacer including transparent colored layers is formed as a spacer between the array substrate and the color filter substrate, the efficiency of the production processes is improved. The kind of transparent colored layers which constitutes a part of the laminate spacer is not particularly limited but at least the yellow transparent layer is included because, as described below, the laminate spacer overlaps the yellow transparent layer.

The laminate spacer is surrounded by the yellow or white transparent layer when viewed in a plan view. The phrase "when viewed in a plan view" specifically means viewing the liquid crystal display panel in the direction of the normal to a substrate surface. The phrase "the laminate spacer is surrounded by the yellow or white transparent layer" specifically means that (1) the laminate spacer is formed in an area which constitutes a part of a display region and in which the yellow or white transparent layer is formed, or that (2) the laminate spacer does not overlap the two different transparent colored layers in pixel openings but is formed between them, and thus does not strictly means that transparent layers surround the entire laminate spacer. Examples of the "two different transparent colored layers" include yellow and yellow transparent layers, white and white transparent layers, and yellow and white transparent colored layers. Since the laminate spacer is surrounded by yellow and/or white transparent layer(s), a serious display trouble can be avoided because if a short circuit arises between the first and second electrodes, a display trouble may occur only in the yellow transparent layer and the corresponding first electrode, and this short circuit does not affect the red, green, and blue pixels. Therefore, additional production processes such as formation of an insulating film are not necessary.

The structure of the liquid crystal display panel of the present invention is not particularly limited by other components, provided that it essentially includes the above-mentioned components.

The following gives a detailed explanation of preferred embodiments of the liquid crystal display panel of the present invention.

Preferably, the yellow or white transparent layer is formed in a stripe pattern. The "stripe pattern" herein means both of a pattern in which a continuous line of the transparent yellow layer extends and a pattern in which dots of the yellow transparent layer are arranged in a line. If the yellow or white transparent layer is formed in a stripe pattern, a larger area can be secured for formation of the laminate spacer at a position surrounded by the yellow or white transparent layer, which facilitates formation of the laminate spacer. The stripe pattern of the yellow or white transparent layer (the direction of the stripes) may extend in either the column direction or the row direction. In terms of production efficiency, it is preferable that a line of the yellow or white transparent layer is formed instead of independent dots thereof.

The four or more differently colored transparent layers are preferably formed in a matrix pattern, and more preferably in a squared (2×2) pattern. The "matrix" pattern herein means that colors adjacent in the column and row directions are different. The "squared (2×2) pattern" means that the four colors are repeatedly arranged in a certain order along the column and row directions, thereby forming a polygonal shape such as square or rectangle (i.e. 2×2 pattern). This pattern can reduce the number of electric lines compared to the case of the three primary colors (for example, RGB).

It is preferable that the array substrate further includes a line that extends in a direction perpendicular to a length direction of the stripe pattern of the yellow or white transparent layer, and the laminate spacer overlaps the line. In this case, the line also constitutes a part of the laminate spacer. Examples of such lines include gate lines of an active matrix substrate which supply a scan signal, source lines for supplying an image signal, and storage capacitor lines (Cs lines) for maintaining the capacitance of the first electrode constant. If the laminate spacer overlaps the line, a larger area of the transparent colored layers can be secured for display, thereby providing an enhanced aperture ratio.

The second electrode preferably constitutes the top layer of the laminate spacer. Specifically, it is preferable that the second electrode constituting a part of the laminate spacer is closer to the array substrate than the transparent colored layers and that the second electrode is in contact with the array substrate. Since in the production of the color filter substrate, the transparent colored layers, which are involved in display, are formed prior to the second electrode, it is preferable to form the transparent colored layers prior to the second electrode also in the production of the laminate spacer. In this case, the efficiency of the production processes is improved. According to the present embodiment, the production processes can be simplified because any process for forming an insulting film such as an alignment film on the laminate spacer is not necessary. In addition, the present invention can avoid a large deterioration on the display quality even though the electrode is exposed as described above. This is because a display trouble may occur only in the yellow or white transparent layer even if a short circuit arises.

Effects of the Invention

The liquid crystal display panel of the present invention can achieve a wider color reproduction range, avoid a remarkable deterioration of the display quality even if a short circuit arises between substrates through a laminate spacer, and simplify the production method.

MODES FOR CARRYING OUT THE INVENTION

Hereinafter, the present invention is described in more detail by way of embodiments, but these embodiments are not intended to limit the present invention.

First Embodiment

Figure 1:
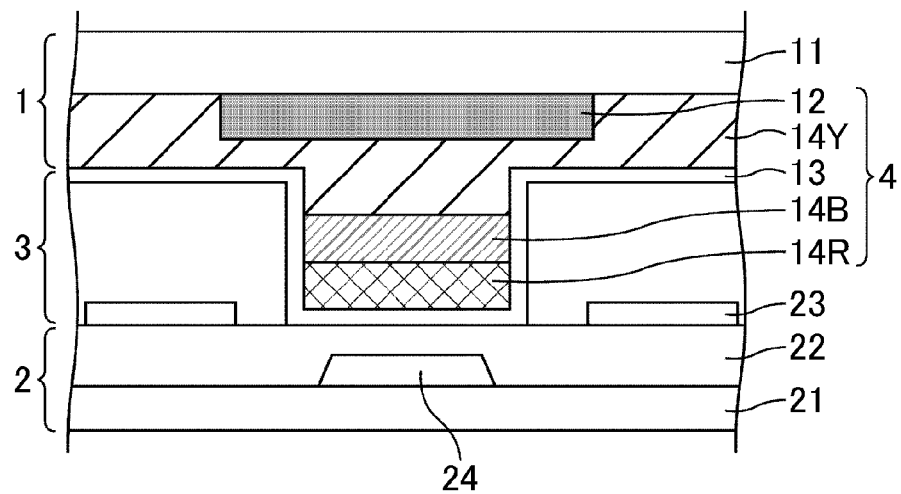
FIG. 1 is a cross-sectional view of a liquid crystal display panel of a first embodiment which schematically illustrates an area where a laminate spacer is formed.

FIG. 1 is a cross-sectional view of a liquid crystal display panel of the first embodiment which schematically illustrates an area where a laminate spacer is formed. As shown in FIG. 1, the liquid crystal display panel of the first embodiment includes a liquid crystal layer 3 sandwiched between an array substrate 2 and a color filter substrate 1, and a laminate spacer 4 ensures a distance (cell gap) between the array substrate 2 and the color filter substrate 1. The laminate spacer 4 is formed on the color filter substrate 1 and their top layers are in contact with the array substrate 1.

Both the array substrate 2 and the color filter substrate 1 are mainly composed of insulating substrates 11 and 21, respectively, and various components are formed on the insulating substrate 11 and 21.

The laminate spacer 4 includes a black matrix (light blocking layer) 12; a yellow color filter (transparent colored layer) 14Y; a blue color filter (transparent colored layer) 14B; a red color filter (transparent colored layer) 14R; and a common electrode (second electrode) 13. These components are stacked in this order toward the array substrate 2. Therefore, in the first embodiment, the top layer of the laminate spacer 4 is the common electrode 13, and the common electrode 13 is in contact with the array substrate 2.

The array substrate 2 has a plurality of pixel electrodes (first electrodes) 23. In the first embodiment 1, the array substrate 2 is an active matrix substrate that drives the pixel electrodes using a plurality of thin-film transistors (TFTs), and is provided with gate lines 24 for supplying a scan signal to the TFTs. The pixel electrodes 23 and the gate lines 24 are present at different levels separated by an insulating film 22. Each of the TFTs is a three-terminal field effect transistor provided with a semiconductor layer.

The color filter which surrounds the laminate spacer 4 is the yellow color filter 14Y, and the common electrode 13 is formed on the yellow color filter 14Y. The pixel electrodes 23 which surround the laminate spacer 4 among the pixel electrodes 23 of the array substrate 2 face the yellow color filter 14Y of the color filter substrate 1. Thus, the pixels which surround the laminate spacer 4 are yellow pixels. In order to avoid a short circuit between the common electrode 13 of the color filter substrate 1 and the pixel electrodes 23 of the array substrate 2, the above-mentioned components separate them by a certain distance.

In the structure of the first embodiment described above, a short circuit (leak) may arise between the common electrode 13 of the color filter substrate 1 and the pixel electrodes 23 of the array substrate 2 due to a change of their positional relationship which may be caused when pressing force is applied to the laminate spacer due to, for example, an external pressure to the liquid crystal display panel. The structure of the first embodiment, however, can avoid a large impact on the display quality. This is because the laminate spacer 4 is surrounded by the yellow pixels. Even if a display trouble occurs in a yellow pixel due to a short circuit, the red, green, and blue pixels can compensate colors as long as no display trouble occurs in these pixels.

Figure 2:
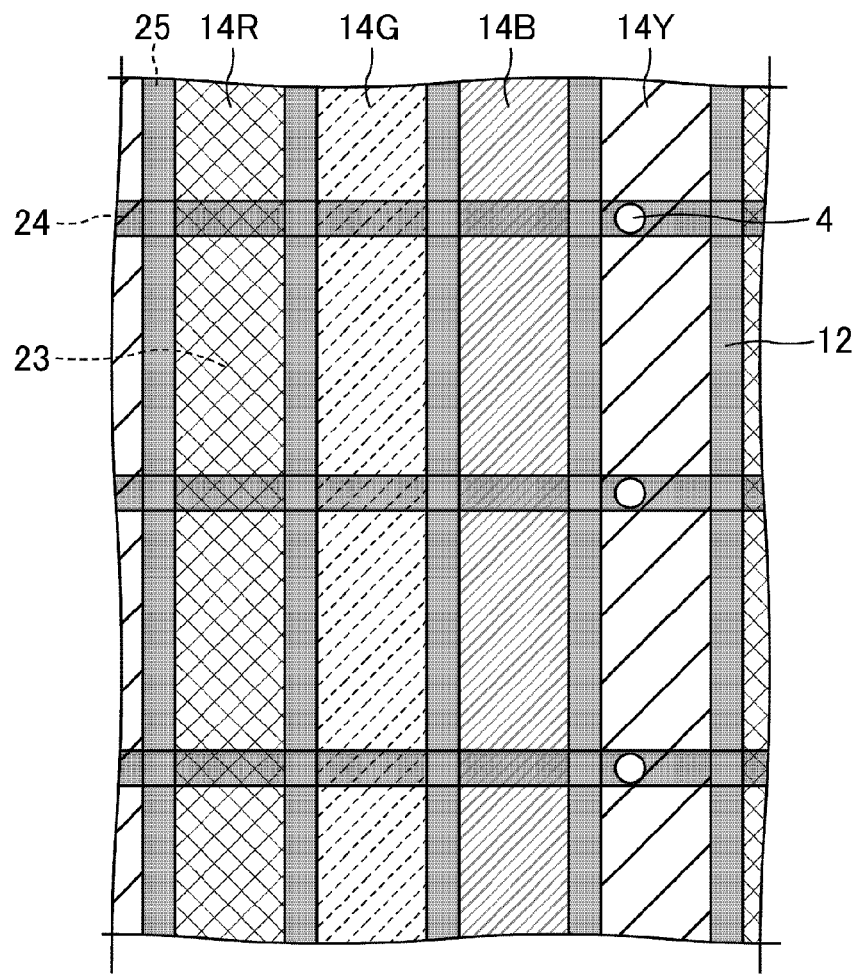
FIG. 2 is a schematic plan view of the liquid crystal display panel of the first embodiment.

FIG. 2 is a schematic plan view of the liquid crystal display panel of the first embodiment. As shown in FIG. 2, the color filter substrate 1 of the liquid crystal display panel of the first embodiment includes the four color filters involved in display: the red color filter 14R; the green color filter 14G; the blue color filter 14B; and the yellow color filter 14Y. Each of these color filters 14R, 14G, 14B, and 14Y is formed in a stripe pattern, and lines of these extend in the column direction across the boundaries of pixels.

The color filters 14R, 14G, 14B, and 14Y are capable of producing colored display light by allowing only a component in a specific wavelength range in the visible range to pass therethrough. Desired color display can be achieved by selecting an appropriate color combination of color filters. Thus, the areas where the color filters 14R, 14G, 14B, and 14Y are formed serve as pixel openings.

The black matrix 12 extends between the color filters 14R, 14G, 14B, and 14Y, that is, overlaps the gate lines 24 and the source lines 25 of the array substrate 1. The black matrix as a whole has a lattice shape.

The array substrate 2 of the liquid crystal display panel of the first embodiment is provided with the gate lines 24 which extend in the row direction; the source lines 25 which extend in the column direction; and the TFTs near the intersections between them. The pixel electrodes 23 are formed in the respective areas defined by the gate lines 24 and the source lines 25, and as a whole are arranged in a matrix pattern. The gate lines 24, the source lines 25, and the pixel electrodes 23 are formed at different levels separated by the insulating film 22. When receiving scan signals from the gate lines 24, the TFTs supply, to the pixel electrodes 23, image signals having been transmitted from the source lines 25. As the stripe pattern of the color filters 14R, 14G, 14B, and 14Y extends in the column direction, the gate lines 24 extending in the row direction are perpendicular to the stripe pattern of the color filters 14R, 14G, 14B, and 14Y.

In the first embodiment 1, the laminate spacer 4 is surrounded by the yellow color filter 14Y that is formed in a stripe pattern, and overlap the gate lines 24. As the laminate spacer 4 is formed at the above positions, they are surrounded by the yellow pixels, as described above. This structure can avoid a large impact on the display quality even if a short circuit arises between the common electrode 13 and the pixel electrodes 23.

The color filters 14R, 14B, and 14Y constituting a part of the laminate spacer 4 of FIG. 1 can be formed at the same time as the formation of color filters 14R, 14B, and 14Y serving as pixel openings shown in FIG. 2, which results in improvement in the production efficiency. Therefore, the red color filter 14R in the laminate spacer and the red color filter 14R serving as a pixel opening are preferably made of the same material, the blue color filter 14B in the laminate spacer and the blue color filter 14B serving as pixel opening are preferably made of the same material, and the yellow filter 14Y in the laminate spacer and the yellow filter 14Y serving as a pixel opening are preferably made of the same material.

Figure 3:
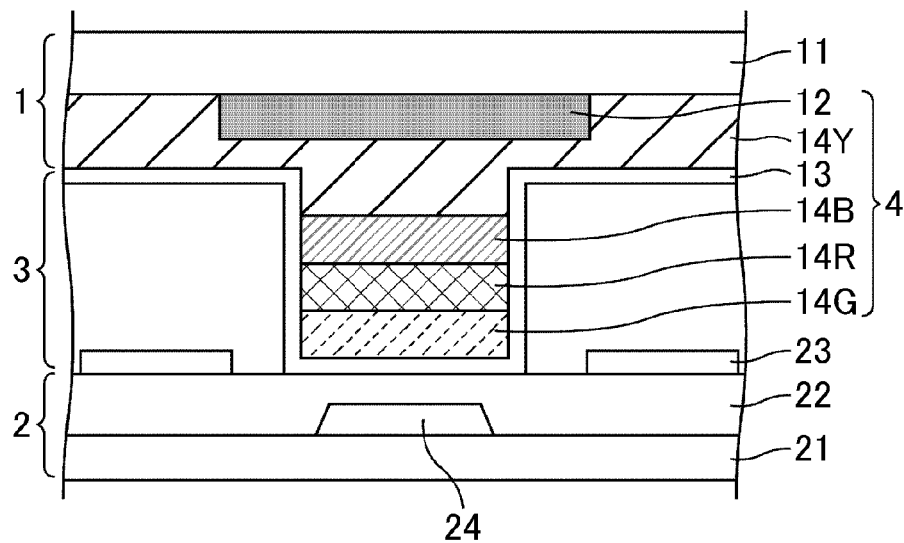
FIG. 3 is a schematic cross-sectional view of a first modified example of the first embodiment.

Although in the example shown in FIG. 1, the color filters constituting a part of the laminate spacer are the red color filter 14R, the blue color filter 14B, and the yellow color filter 14Y, the type and the number of color filters constituting a part of the laminate spacer of the first embodiment are not particularly limited. For example, as shown in FIG. 3, the laminate spacer may include all the four color filters including the green color filter 14G. FIG. 3 is a schematic cross-sectional view of the first modified example of the first embodiment.

Figure 4:
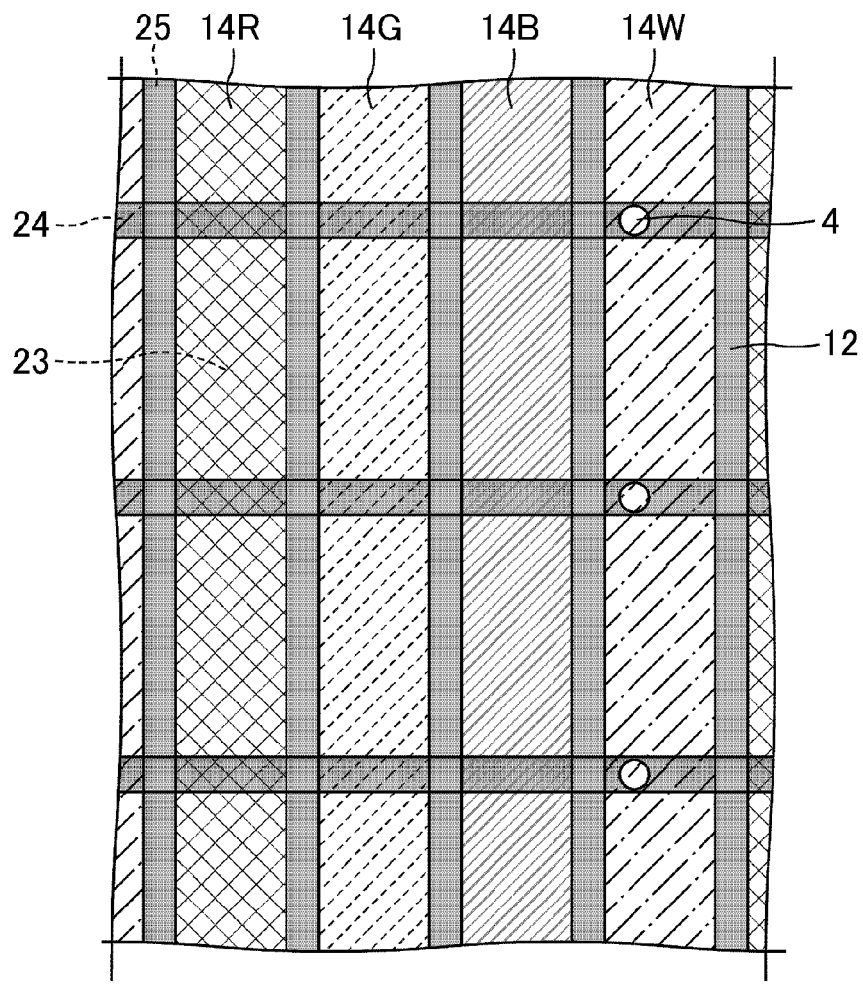
FIG. 4 is a schematic plan view of a second modified example of the first embodiment.
Figure 5:
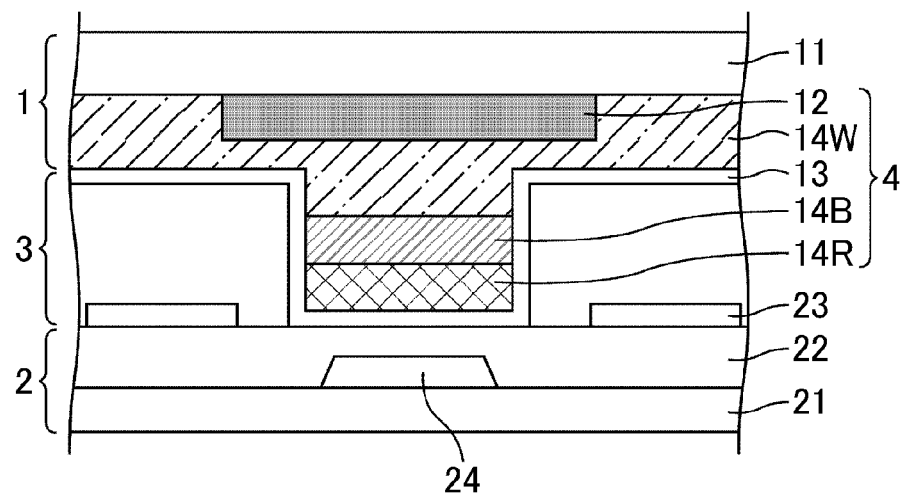
FIG. 5 is a schematic cross-sectional view of the second modified example of the first embodiment.

Although in the example shown in FIG. 2, the color filters serving as pixel openings are the red color filter 14R, the green color filter 14G, the blue color filter 14B, and the yellow color filter 14Y, for example, a white color filter 14W may be formed instead of the yellow color filter 14Y, as shown in FIG. 4. FIG. 4 is a schematic plan view of the second modified example of the first embodiment in which the laminate spacer 4 is surrounded by the white color filter 14W. FIG. 5 is a schematic cross-sectional view of the second modified example of the first embodiment in which the laminate spacer 4 is surrounded by the pixel electrodes 23 which face the white color filter 14W.

Figure 6:
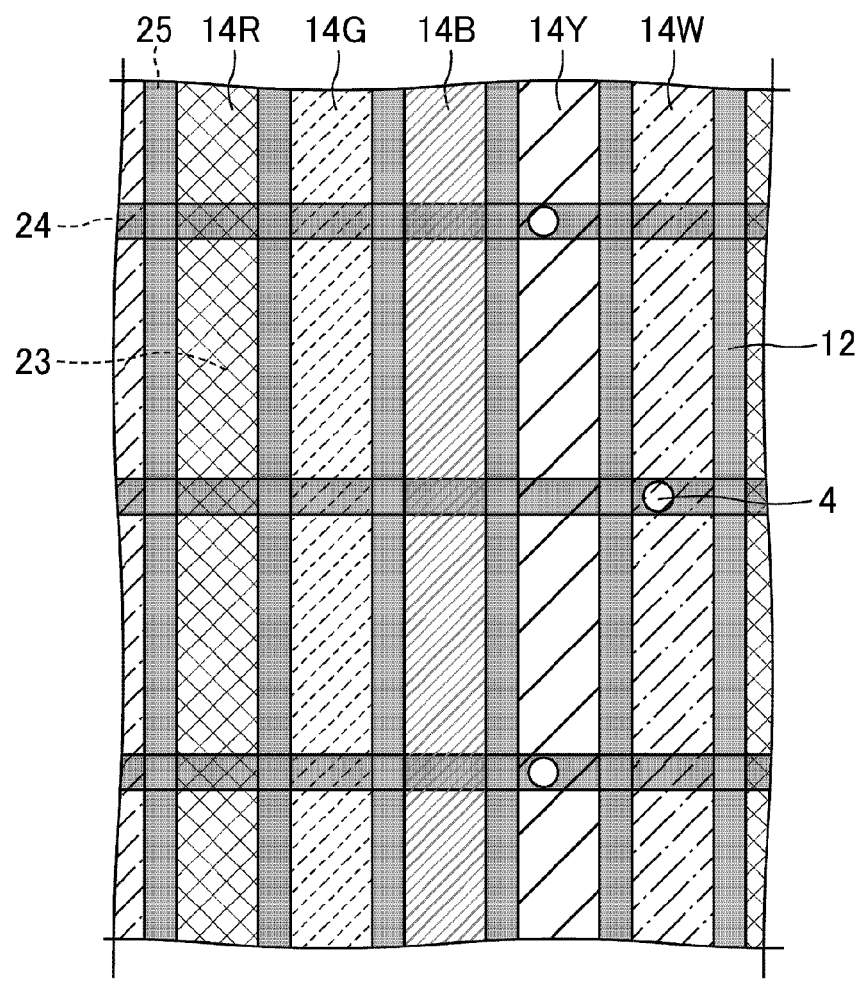
FIG. 6 is a schematic plan view of a third modified example of the first embodiment.

In the first embodiment, the color filters serving as pixel openings may be five color filters: the red color filter 14R, the green color filter 14G, the blue color filter 14B, the yellow color filter Y, and the white color filter 14W, as shown in, for example, FIG. 6. FIG. 6 is a schematic plan view of the third modified example of the first embodiment in which the laminate spacer is surrounded by the yellow color filter 14Y and the white color filter 14W.

Figure 7:
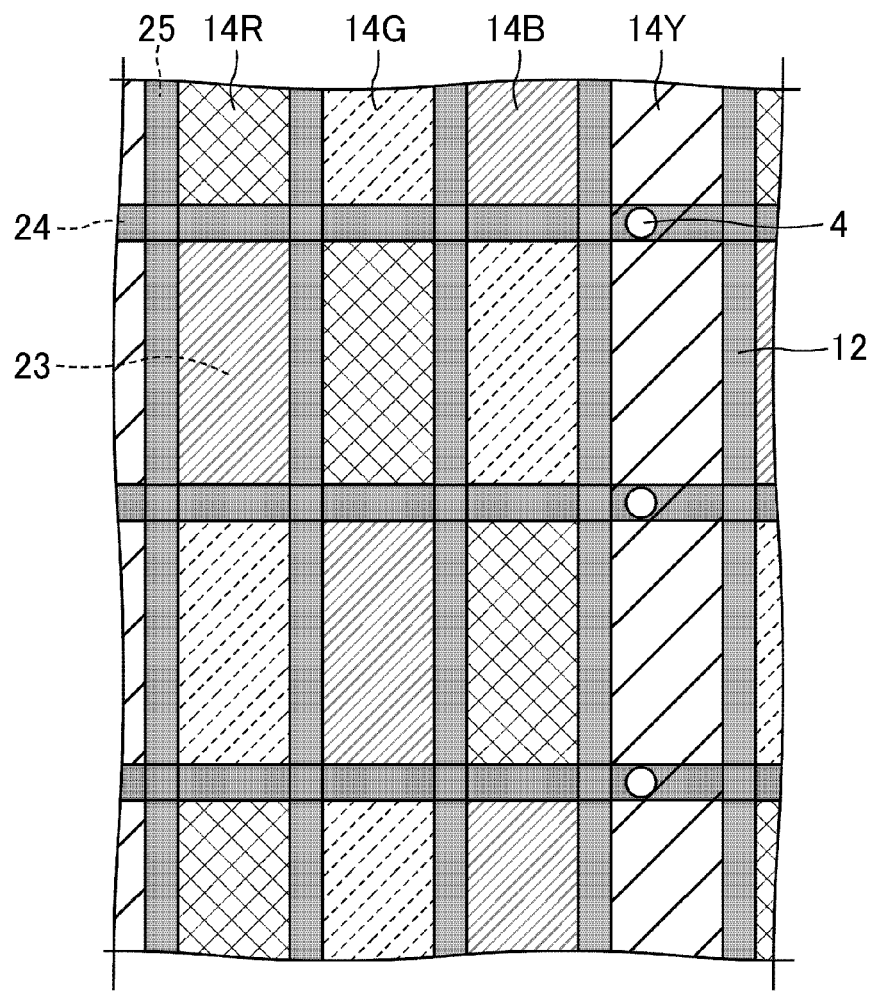
FIG. 7 is a schematic plan view of a fourth modified example of the first embodiment.

Although in the example shown in FIG. 2, each of the color filters 14R, 14G, 14B, and 14Y is formed in a stripe pattern, the pattern of the color filters is not particularly limited in the first embodiment. FIG. 7 is a schematic plan view of the fourth modified example of the first embodiment in which the red, green, and blue color filters 14R, 14G, and 14B are formed in a matrix pattern, and only the yellow color filter 14Y is formed in a stripe pattern.

Figure 8:
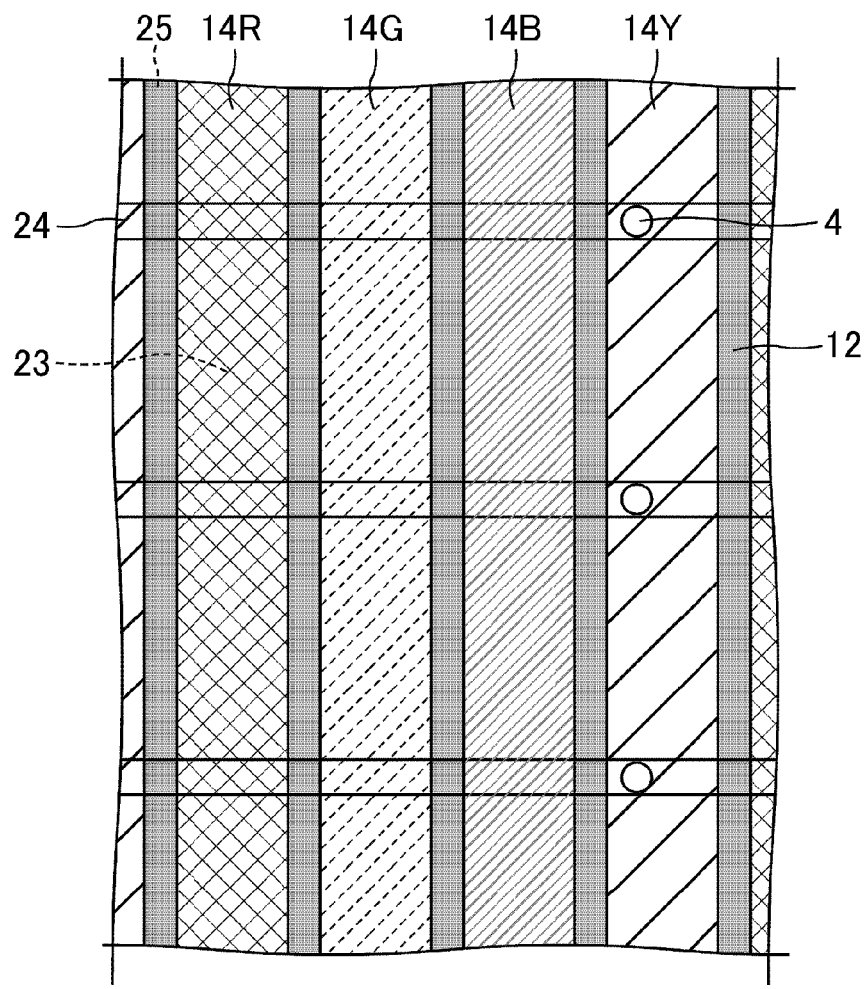
FIG. 8 is a schematic plan view of a fifth modified example of the first embodiment.
Figure 9:
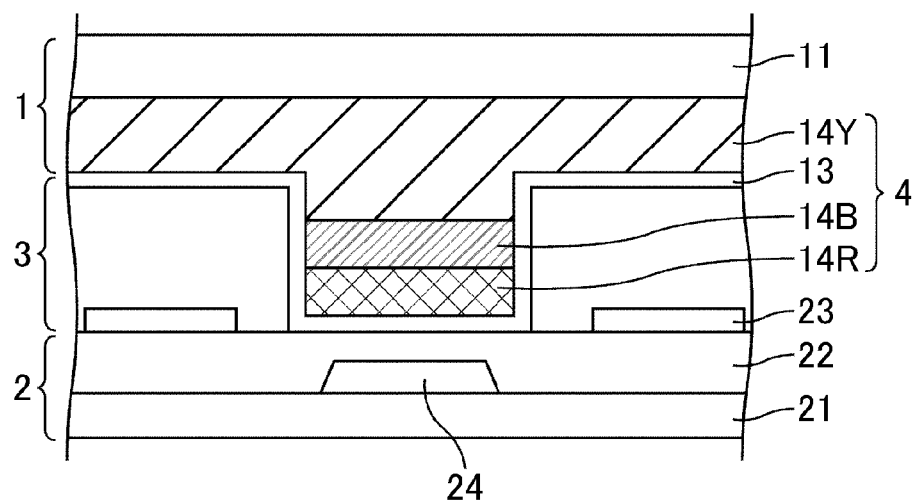
FIG. 9 is a schematic cross-sectional view of the fifth modified example of the first embodiment.

Although in the example shown in FIG. 2, the black matrix 12 overlaps the gate lines 24 and the source lines 25, the black matrix 12 may not overlap the gate lines 24 in the first embodiment, as shown in, for example, FIG. 8. FIG. 8 is a schematic plan view of the fifth modified example of the first embodiment. FIG. 9 is a schematic cross-sectional view of the fifth modified example of the first embodiment.

Figure 10:
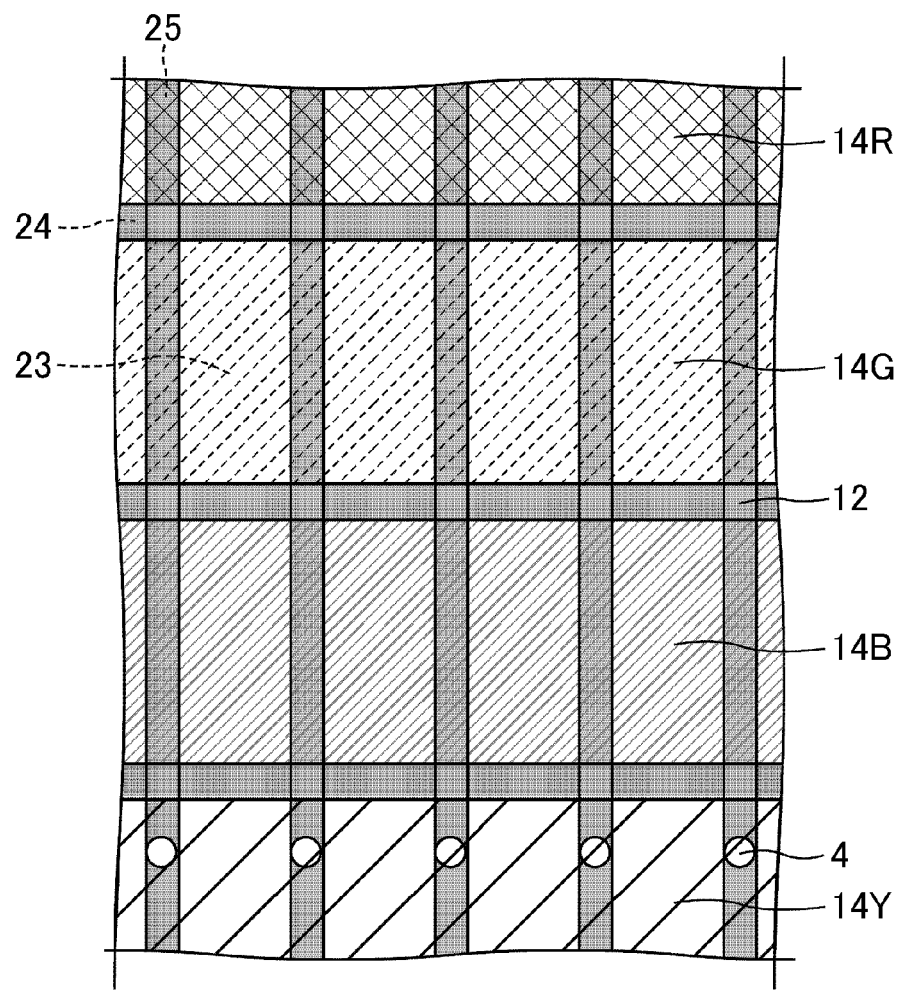
FIG. 10 is a schematic plan view of a sixth modified example of the first embodiment.

Although, in FIG. 2, the yellow color filter 14Y is formed in a stripe pattern along the column direction, the yellow color filter 14Y may be formed in a stripe pattern along the row direction in the first embodiment, as shown in FIG. 10. FIG. 10 is a schematic plan view of the sixth modified example of the first embodiment. In the sixth modified example of the first embodiment, the laminate spacer overlaps the source lines which are perpendicular to the stripe pattern of the yellow color filter 14Y along the row direction.

In any of the modified examples of the first embodiment described above, the white color filter 14W may be formed instead of the yellow color filter 14Y.

The color filters 14R, 14G, 14B, and 14Y, and the black matrix 12 can be formed by any method. Examples of such methods include: (1) a method that includes forming a photosensitive resin film by applying a photosensitive resin material to the insulating substrate 11 with a coater, and patterning the photosensitive resin film by photolithography; (2) a method that includes transferring a photosensitive resin film on the insulating substrate 11 using a dry film that is composed of a base material and a photosensitive resin film attached thereto, and patterning the photosensitive resin film by photolithography.

Examples of methods for forming the common electrode 13 include a method that includes forming a conductive film by applying a conductive material to the insulating substrate 11 with a coater, and patterning the conductive film by photolithography.

The color filters 14R, 14G, 14B, and 14Y, and the black matrix 12 may be formed in any order. Also, the common electrode 13 and the black matrix 12 may be formed in any order but the common electrode needs to be formed after the color filters 14R, 14G, 14B, and 14Y.

Examples of materials for the color filters 14R, 14G, 14B, and 14Y, and the black matrix 12 include resin materials such as photosensitive resins with various color pigments dispersed therein. Examples of materials for the common electrode 13 include metal oxides such as indium tin oxide (ITO) and indium zinc oxide (IZO).

Second Embodiment

The liquid crystal display panel of the second embodiment has the same structure as the liquid crystal display panel of the first embodiment, except that dots of the yellow color filter 14Y are formed in accordance with the pixels unlike the stripe pattern.

Figure 11:
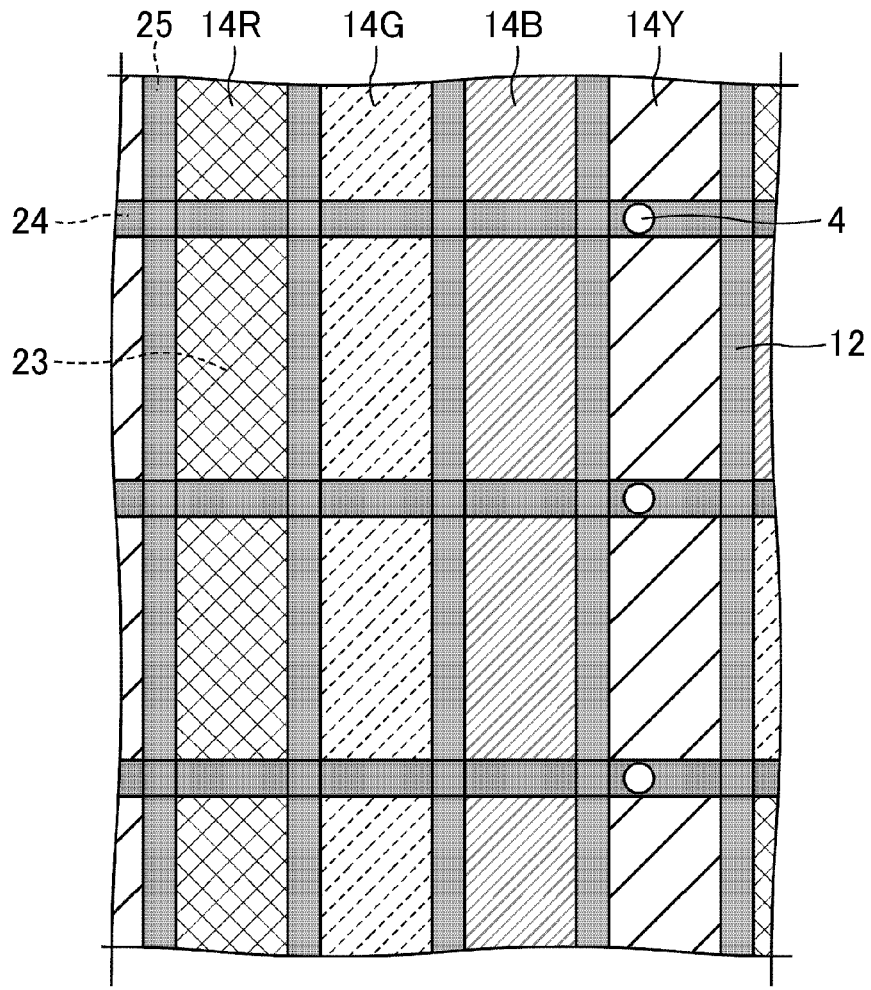
FIG. 11 is a schematic plan view of a liquid crystal display panel of a second embodiment.

FIG. 11 is a schematic plan view of the liquid crystal display panel of the second embodiment. As shown in FIG. 11, the yellow color filter 14Y of the second embodiment is divided in accordance with the pixels by the black matrix 12 that overlaps the gate lines 24 and the source lines 25. As a whole, a plurality of yellow filters 14Y are arranged in a stripe pattern along the column direction.

In the second embodiment, the laminate spacer 4 is surrounded by the yellow color filters 14Y and overlaps the gate lines 24. Since the laminate spacer 4 is surrounded by the yellow pixels, this structure can avoid a large impact on the display quality even if a short circuit arises between the common electrode 13 and the pixel electrodes 23.

Figure 12:
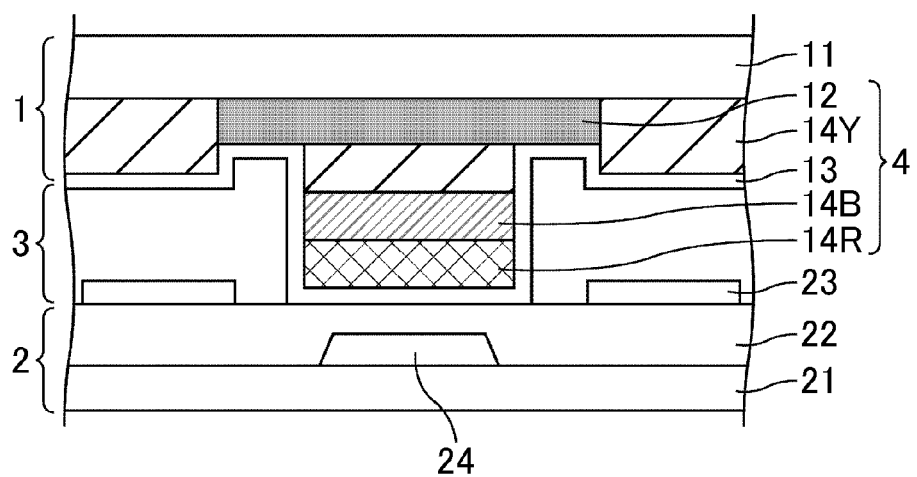
FIG. 12 is a cross-sectional view of the liquid crystal display panel of the second embodiment which schematically illustrates an area where a laminate spacer is formed.
Figure 13:
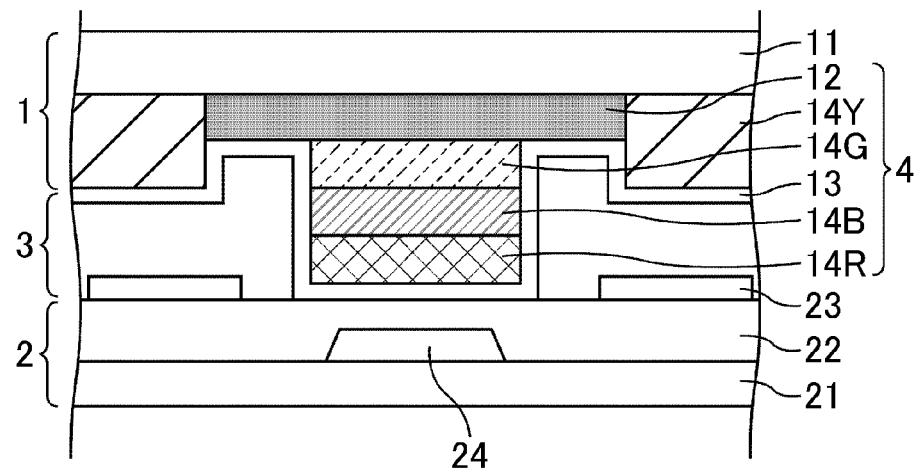
FIG. 13 is a schematic cross-sectional view of a first modified example of the second embodiment.

FIG. 12 is a cross-sectional view of the liquid crystal display panel of the second embodiment which schematically illustrates an area where a laminate spacer is disposed, and FIG. 13 is a modified example thereof (the first modified example of the second embodiment). As shown in FIGS. 12 and 13, the laminate spacer 4 includes the black matrix 12 and color filters. In the second embodiment, the laminate spacer 4 may include the yellow color filter 14Y, as shown in FIG. 12, or may not include the yellow color filter, as shown in FIG. 13.

Figure 14:
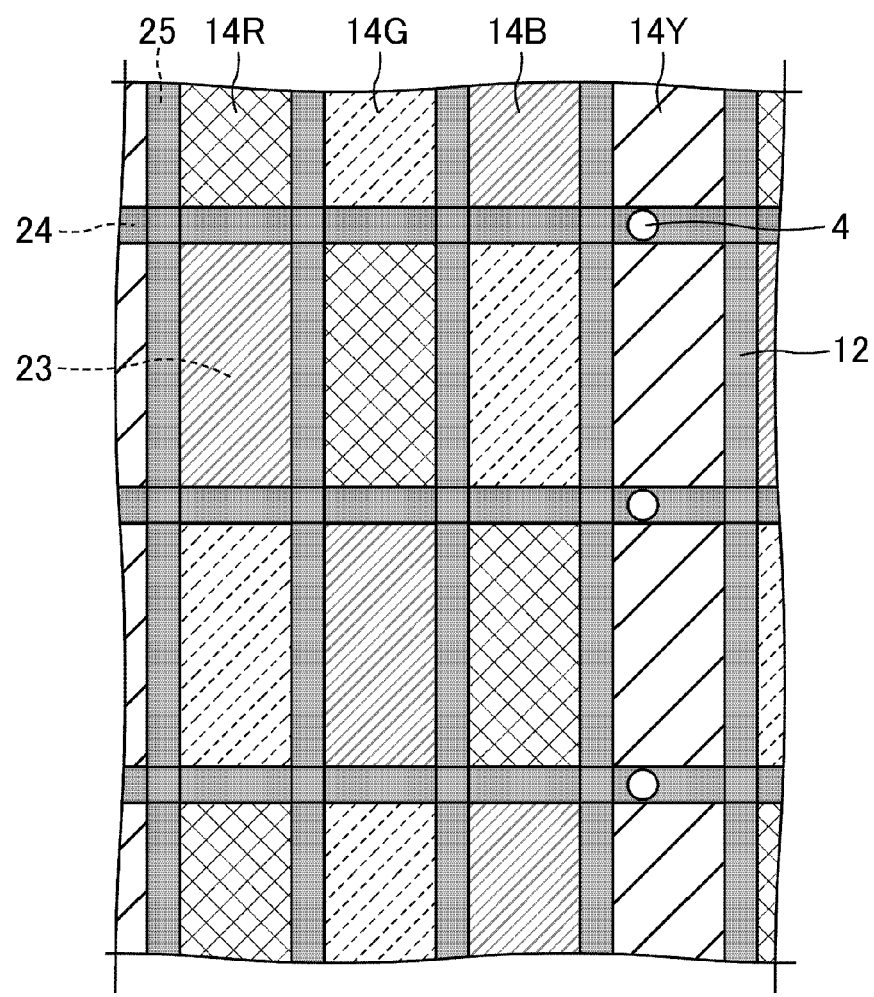
FIG. 14 is a schematic plan view of a second modified example of the second embodiment.

Although, in FIG. 11, the red, green, and blue color filters 14R, 14G, and 14B as well as the yellow color filters 14Y are all formed in a stripe pattern, only the red, green, and blue color filters 14R, 14G, and 14B may be formed in a matrix pattern, as shown in, for example, FIG. 14. FIG. 14 is a schematic plan view of the second modified example of the second embodiment.

In both the second embodiment and the modified example thereof described above, the white color filter 14W may be formed instead of the yellow color filter 14Y.

Third Embodiment

Figure 15:
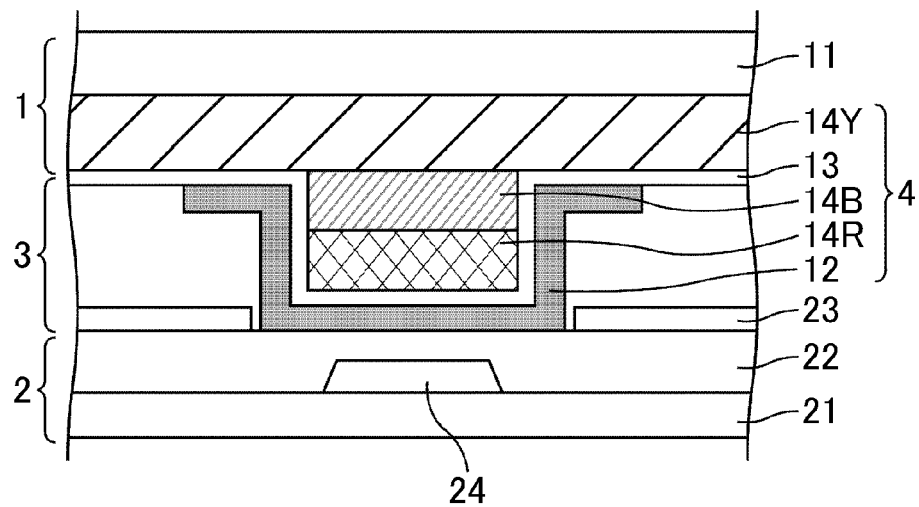
FIG. 15 is a cross-sectional view of a liquid crystal display panel of a third embodiment which schematically illustrates an area where a laminate spacer is formed.

The liquid crystal display panel of the third embodiment has the same structure as the liquid crystal display panel of the first embodiment, except that the top layer of the laminate spacer is not the common electrode. FIG. 15 is a cross-sectional view of the liquid crystal display panel of the third embodiment which schematically illustrates an area where the laminate spacer is formed. In the third embodiment, as shown in FIG. 15, the black matrix 12 constitutes the top layer of the laminate spacer 4, the common electrode 13 is sandwiched between the red color filter 14R and the black matrix 12. This structure can be formed by changing the order of the production processes of the components of the laminate spacer 4 (the order of layers).

The laminate spacer 4 according to the third embodiment is surrounded by the yellow color filter 14Y that is formed in a stripe pattern, and overlap the gate lines 24. Since the laminate spacer 4 is surrounded by the yellow pixels, this structure can avoid a large impact on display quality even if a short circuit arises between the common electrode 13 and the pixel electrodes 23 due to damage to the black matrix 12 which may be caused when pressing force is applied to the laminate spacer due to, for example, an external pressure to the liquid crystal display panel. In the third embodiment, the white color filter 14W may be formed instead of the yellow color filter 14Y.

Fourth Embodiment

The liquid crystal display panel of the fourth embodiment has the same structure as the liquid crystal display panel of the first embodiment, except that all the color filters 14R, 14G, 14B, and 14Y are formed in a matrix pattern (in particular, squared (2×2) pattern), and that the laminate spacer overlaps storage capacitor lines (CS lines) not the gate lines.

Figure 16:
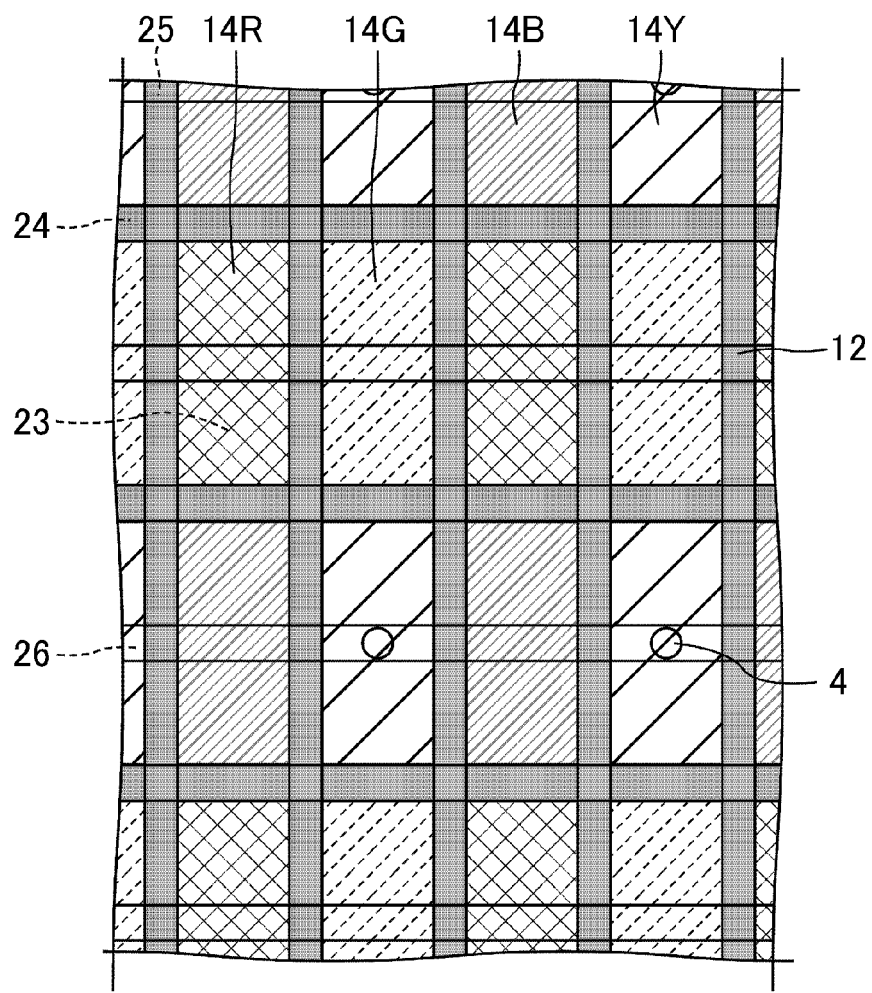
FIG. 16 is a schematic plan view of a liquid crystal panel of a fourth embodiment.

FIG. 16 is a schematic plan view of a liquid crystal panel of the fourth embodiment. In the fourth embodiment, as shown in FIG. 16, the yellow color filter 14Y is divided by the black matrix 12 overlapping the gate lines 24 and the source lines 25, and is formed in a matrix pattern such that the adjacent colors in the row and column directions are different. More specifically, the red, green, blue, and yellow color filters of the fourth embodiment are formed such that each of the four colors constitutes a squared (2×2) pattern, as shown in FIG. 16. This structure reduces the number of source lines 25 to ⅔ compared to the case of only three primary colors: red; green; and blue.

In the fourth embodiment, the laminate spacer 4 is formed in the yellow color filters 14Y serving as pixel openings and overlap the Cs line 26. Since the laminate spacer 4 is surrounded by the yellow pixels, this structure can avoid a large impact on display quality even if a short circuit arises between the common electrode 13 and the pixel electrode 23. In the fourth embodiment, the white color filter 14W may be formed instead of the yellow color filter 14Y.

Figure 17:
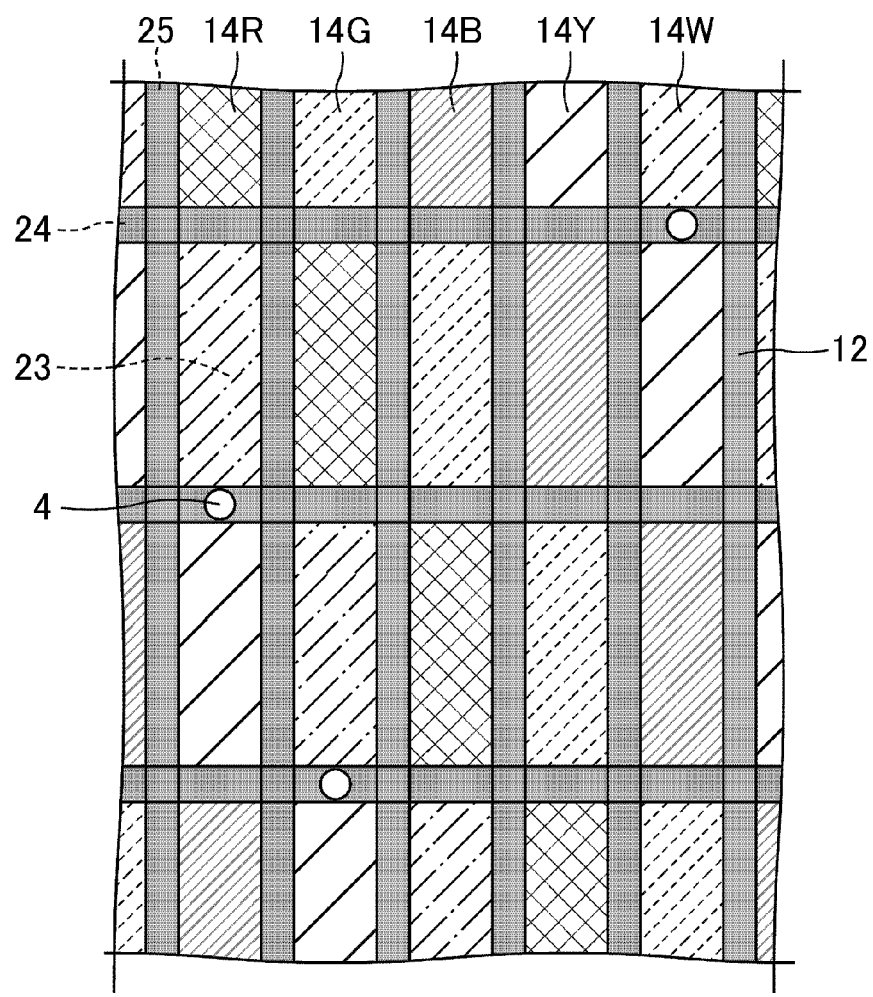
FIG. 17 is a schematic plan view of a modified example of the fourth embodiment.

In FIG. 16, the laminate spacer 4 overlaps the CS line 26. In the fourth embodiment, in the case of five color filters 14R, 14G, 14B, 14Y, and 14W, the laminate spacer may be formed above the gate lines 24 between the yellow color filters 14Y and the white color filters 14W, as shown in FIG. 17. FIG. 17 is a plan view schematically illustrating a modified example of the fourth embodiment. In this figure, the laminate spacer 4 is surrounded by the yellow color filters 14Y and the white color filters 14W.

The present application claims priority to Patent Application No. 2009-228586 filed in Japan on Sep. 30, 2009 under the Paris Convention and provisions of national law in a designated State, the entire contents of which are hereby incorporated by reference.

EXPLANATION OF SYMBOLS

1: Color Filter Substrate
2: Array Substrate
3: Liquid Crystal Layer
4: Laminate Spacer
11: Insulating Substrate
12: Black Matrix
13: Common Electrode (Second Electrode)
14R: Red Color Filter (Transparent Colored Layer)
14G: Green Color Filter (Transparent Colored Layer)
14B: Blue Color Filter (Transparent Colored Layer)
14Y: Yellow Color Filter (Transparent Colored Layer)
14W: White Color Filter (Transparent Colored Layer)
21: Insulating Substrate
22: Insulating Film
23: Pixel Electrode
24: Gate Line
25: Source Line
26: CS Line

The invention claimed is:

1. A liquid crystal display panel comprising:
an array substrate provided with a first electrode;
a color filter substrate provided with a second electrode; and
a liquid crystal layer sandwiched between the array substrate and the color filter substrate,
wherein the color filter substrate further includes: four or more differently colored transparent layers, the colors of which include red, green, blue, and at least one of yellow and white; and
a laminate spacer formed by the second electrode and at least two layers among the four or more differently colored transparent layers, and
the laminate spacer is surrounded by the yellow or white transparent layer when viewed in a plan view.

2. The liquid crystal display panel according to claim 1, wherein the yellow or white transparent layer is formed in a stripe pattern.

3. The liquid crystal display panel according to claim 2, wherein the array substrate further includes a line that extends in a direction perpendicular to a length direction of the stripe pattern of the yellow or white transparent layer, and
the laminate spacer overlaps the line.

4. The liquid crystal display panel according to claim 1, wherein the four or more differently colored transparent layers are formed in a matrix pattern.

5. The liquid crystal display panel according to claim 1, wherein the second electrode constitutes the top layer of the laminate spacer.

* * * * *